United States Patent
Lecky

(10) Patent No.: US 7,362,073 B2
(45) Date of Patent: Apr. 22, 2008

(54) DYNAMIC FUEL CELL SYSTEM MANAGEMENT CONTROLLER

(75) Inventor: John Edward Lecky, Albany, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 439 days.

(21) Appl. No.: 10/719,456

(22) Filed: Nov. 21, 2003

(65) Prior Publication Data

US 2005/0110453 A1 May 26, 2005

(51) Int. Cl.
*H01M 10/44* (2006.01)
(52) U.S. Cl. ...................................... 320/132
(58) Field of Classification Search ................ 320/101, 320/132; 429/22, 23
See application file for complete search history.

(56) References Cited

U.S. PATENT DOCUMENTS

| | | | |
|---|---|---|---|
| 4,904,548 A * | 2/1990 | Tajima ........................ | 429/22 |
| 5,439,756 A | 8/1995 | Anani et al. | |
| 5,585,749 A | 12/1996 | Pace et al. | |
| 5,587,250 A | 12/1996 | Thomas et al. | |
| 5,659,206 A | 8/1997 | Taguchi et al. | |
| 5,670,266 A | 9/1997 | Thomas et al. | |
| 5,736,833 A | 4/1998 | Farris | |
| 5,744,984 A | 4/1998 | Drapac et al. | |
| 5,916,699 A | 6/1999 | Thomas et al. | |
| 6,087,812 A | 7/2000 | Thomas et al. | |
| 6,214,487 B1 | 4/2001 | Kelley et al. | |
| 6,322,917 B1 | 11/2001 | Acker | |
| 6,423,434 B1 | 7/2002 | Pratt et al. | |
| 6,428,917 B1 | 8/2002 | Lacy et al. | |
| 6,433,522 B1 | 8/2002 | Siri | |
| 6,504,339 B2 | 1/2003 | Parks et al. | |
| 6,555,989 B1 | 4/2003 | Pearson | |
| 6,580,977 B2 | 6/2003 | Ding et al. | |
| 6,583,523 B1 | 6/2003 | Bhate | |
| 6,590,370 B1 | 7/2003 | Leach | |
| 2002/0197522 A1 | 12/2002 | Lawrence et al. | |
| 2003/0091882 A1* | 5/2003 | Schmidt et al. ................ | 429/23 |
| 2003/0175566 A1* | 9/2003 | Fisher et al. ................... | 429/22 |
| 2005/0048335 A1* | 3/2005 | Fields, III et al. ............ | 429/22 |

FOREIGN PATENT DOCUMENTS

SU 1610522 A1 11/1990

OTHER PUBLICATIONS

Invitation to Pay Additional Fees, PCT/US2004/041173, International Filing Date Nov. 19, 2004, Date of Mailing Feb. 14, 2006.
"Notification of Transmittal of the International Search Report and the Written Opinion of the International Searching Authority, or the Declaration" of International Application No. PCT/US2004/041173 with an International Filing Date of Nov. 19, 2004.

* cited by examiner

*Primary Examiner*—Edward H Tso
(74) *Attorney, Agent, or Firm*—Cesari and McKenna LLP

(57) ABSTRACT

A method and system for dynamically controlling and managing a fuel cell system is provided. The method and system ensures that predetermined operating parameters and conditions are met. This is achieved using programmable on-board hardware that is already available in the fuel cell system and does not require additional components. More specifically, operating characteristics are measured such as the voltage of the weakest cell, the stack output voltage, the stack output current, the current of a battery being charged by the stack and/or the power of the stack. When each of these measurements is taken, a determination is made to find the load change that should be made in order to adjust the stack voltage to achieve a desired goal. In particular, the load on the fuel cell system can be varied by adjusting the duty cycle of the switches within a DC-DC converter that is being operated by an associated microcontroller. Measurements can also be used to measure methanol concentration and to predict optimal points at which a dosing of additional fuel should be delivered to the fuel cell system.

5 Claims, 8 Drawing Sheets

DYNAMIC FUEL CELL SYSTEM MANAGEMENT CONTROLLER

BACKGROUND OF THE INVENTION

1. Field of the Invention

The present invention relates generally to fuel cell systems and, more specifically, to managing and controlling certain operating characteristics of individual fuel cells, fuel cell stacks and fuel cell arrays.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and generally requires expensive components, which occupy significant volume, reformer based systems are presently limited to comparatively large, high power applications.

Direct oxidation fuel cell systems may be better suited for a number of applications in smaller mobile devices (e.g., mobile phones, handheld and laptop computers), as well as in some larger applications. In direct oxidation fuel cells of interest here, a carbonaceous liquid fuel (typically methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised predominantly of methanol, or methanol and water, is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source, fluid and effluent management systems, and air management systems, as well as a direct methanol fuel cell ("fuel cell"). The fuel cell typically consists of a housing, hardware for current collection and fuel and air distribution, and a membrane electrode assembly ("MEA") disposed within the housing.

The electricity generating reactions and the current collection in a direct oxidation fuel cell system generally take place within the MEA. In the fuel oxidation process at the anode, the products are protons, electrons and carbon dioxide. Protons (from hydrogen found in the fuel and water molecules involved in the anodic reaction) are separated from the electrons. The protons migrate through the membrane electrolyte, which is impermeable to the electrons. The electrons travel through an external circuit, which connects the load, and are united with the protons and oxygen molecules in the cathodic reaction, thus providing electrical power from the fuel cell.

A typical MEA includes a centrally disposed protonically-conductive, electronically non-conductive membrane ("PCM", sometimes also referred to herein as "the catalyzed membrane"). One example of a commercially available PCM is NAFION® a registered trademark of E.I. Dupont de Nemours and Company, a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the catalyzed anode face of the PCM, while allowing the gaseous product of the reaction, typically carbon dioxide, to move away from the anode face of the PCM. In the case of the cathode side, a diffusion layer is used to allow a sufficient supply of and a more uniform distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM through the load.

Direct oxidation fuel cell systems for portable electronic devices should be as small as possible at the power output required. The power output is governed by the rate of the reactions that occur at the anode and the cathode of the fuel cell. More specifically, the anode process in direct methanol fuel cells based on acidic electrolytes, including polyperflourosulfonic acid and similar polymer electrolytes, involves a reaction of one molecule of methanol with one molecule of water. In this process, the oxygen atom in the water molecule is electrochemically activated to complete the oxidation of methanol to a final $CO_2$ product in a six-electron process.

More specifically, direct methanol fuel cell system produces electricity without combustion by oxidizing a carbonaceous fuel (typically methanol in an aqueous solution) on a catalyzed protonically conductive membrane.

The electrochemical reaction equations are as follows:

| | |
|---|---|
| Anode: $CH_3OH + H_2O = CO_2 + 6H^+ + 6e^-$ | Equation 1 |
| Cathode: $6H^+ + 6e^- + 3/2O_2 = 3H_2O$ | Equation 2 |
| Net Process: $CH_3OH + 3/2O_2 = CO_2 + 2H_2O$ | Equation 3 |

Generation of electricity continues until one of the fluids is not available. DMFCs are typically described as "on" i.e. providing electrical current by reacting the fuel and oxygen to generate water, or "off" i.e. at least one fluid is not available because all fuel has been consumed, or air (or other source of oxygen) is prevented from reaching the cathode face of the PCM. Those skilled in the art will recognize that fuel can be delivered to the anode aspect of the MEA as a liquid, or in vaporous form.

Thus, the efficiency of a direct methanol fuel cell system is dependent in part on the amount of fluids and products that are present in the active catalyzed membrane areas and also depends upon adequate hydration of the membrane. For example, particularly in a vapor fed cell, there is a tendency for the catalyzed membrane to dry out during operation, or when the fuel cell is shut down. This is because the vapor feed is not aqueous, instead it is substantially pure fuel, such that there is essentially no excess water on the anode side to keep the membrane hydrated. However, as stated, the membrane should remain well-hydrated for optimal performance. Other operating parameters and other conditions are also important to monitor, in order to maintain the desired fuel cell performance.

More specifically, operating parameters of individual fuel cells in a stack, for example, should optimally be regulated and checked. More specifically, for a given architecture, an optimal voltage exists at which efficiency is maximized at a given fuel cell concentration. For example, at 1.5M (molar) fuel, some cells produce the best overall efficiency when loaded to the point that they produce 0.3 V (volts). Bipolar stacks, for example, consist of many DMFCs in series. In a seven cell stack, with all cells operating optimally, it would be expected that the optimal stack voltage would be about 2.1V. Yet, different cells perform at different levels due to physical manufacturing variations and, more importantly, to anode fuel delivery and $CO_2$ removal, as well as cathode $O_2$ delivery and water removal. For this reason, while driving the overall stack to 2.1V forces the average cell voltage to 0.3V by definition, it does not force all cells to that exact amount, instead there is a minimum and maximum individual cell output voltage. In fact, in certain scenarios, cells can become reversed and do negative work or in extreme prolonged cases can become damaged. Thus, it would be desirable to be able to check each cell and maintain each cell at a specified voltage. However, up to now it has not been straightforward to perform checks that would maximize efficiency and correct asymmetries by keeping all of the cells at an optimal voltage.

Another operating parameter that is desirable to control is the output voltage of the overall stack or array. The optimal stack output voltage value depends upon the mode of operation of the fuel cell system. For example, during normal operations, there is a "RUN" voltage at which the stack should be operating such that the cells in the stack are being run at a normal rate for a given fuel cell concentration. There are other situations in which the stack may be operated as a "hot stack." It is also desirable to maintain a maximum stack current thus requiring that the stack current not drop below that amount.

Furthermore, a fuel cell may be contained within a power supply unit that also contains an internal battery. The power supply unit may then be used to power an application device that itself includes a rechargeable battery (the "external battery"). It may be desirable to cause the internal battery to operate at a particular current level and not drop below that while the external battery is charging. There are also limits on the amount that the external batteries can be charged, in that it is undesirable to overcharge the internal battery, or the external battery. Thus, output current is important in battery charging and management.

Power requirements are also important. As will be understood by those skilled in the art, it may be inefficient to run a fuel cell system at a higher power than required by the application device to which it is delivering power. Thus, a maximum power may be a parameter that is desired to be controlled. Temperature and concentration are also important operating characteristics to be considered in fuel cell design and operation.

It has not always been straightforward, however, to obtain a reading or measurement of various parameters existing at one particular time in a fuel cell or a fuel cell system, given the number of microcomponents in a microfuel cell. In addition, fuel cell operating conditions can change randomly based upon user input. For example, if the fuel cell is powering a wireless telephone, for example, the user may press the "send" button or turn the power on or off. These actions by the user are unpredictable yet they affect the underlying operation of the fuel cell system. Thus, the system ideally should be in a position to dynamically react to such changes in power supply needs or operating conditions.

It has been known to provide a method and apparatus for controlling the operating point, i.e. the output voltage or current of a fuel cell, to a desired value such as that described in commonly-owned U.S. Pat. No. 6,590,370, issued Jul. 8, 2003 of Leach, for a SWITCHING DC-DC POWER CONVERTER AND BATTERY CHARGER FOR USE WITH DIRECT OXIDATION FUEL CELL POWER SOURCE, which is incorporated herein by reference.

However, up to now it has not been practical to dynamically take measurements required to evaluate the above-described operating conditions and parameters. And, a convenient and readily available means for taking corrective action has not been known when it is indicated that such actions are needed based upon the measurements taken. Some measurement devices and corrective features that are known involve large expensive equipment, suitable only for use in a laboratory setting. It is desirable to have an on-board diagnostics and a control system that performs the measurements and takes corrective actions and which is amenable to use within a consumer electronic device.

Therefore, there remains a need for a more easily implemented method and apparatus for measuring operating parameters in a direct oxidation fuel cell, a direct oxidation fuel cell stack or a direct oxidation fuel cell array and for taking corrective actions based on such measurements.

It is thus an object of the invention to provide a method and apparatus for readily measuring various operating parameters of the fuel cell, the fuel cell stack or the fuel cell array, which can provide information and, more particularly, can signal corrective action to be taken based upon such information.

SUMMARY OF THE INVENTION

These, and other disadvantages of prior art techniques, have been overcome by the method and system of the present invention, which involves dynamically controlling and managing operating parameters of a fuel cell system to ensure that predetermined conditions are met. This, in turn, ensures that the fuel cell system will operate efficiently and in the manner desired under particular circumstances. As used herein, the term "fuel cell system" shall include a direct oxidation fuel cell stack, and/or a direct oxidation fuel cell array, and/or an individual direct oxidation fuel cell. Accordingly, it should be understood that although the illustrative embodiment of the invention is described with reference to a fuel cell stack, the invention is not limited thereto, but it is readily adaptable for use with a fuel cell array and/or an individual fuel cell. Thus, the word "stack," as used herein shall include a fuel cell array and an individual fuel cell, and the invention equally applies to an array or an individual fuel cell.

In addition, it should be understood that the invention is not limited to a particular type of fuel cell system, but can include a bipolar system that includes pumps, valves and recirculation loops or a passive system that does not require active water management. Though the fuel substance may be described in the illustrative embodiment as methanol, the invention is not limited thereto, and instead the "fuel substance" used in the fuel cell system described shall include a carbonaceous fuel substantially comprised of alcohols such as methanol and ethanol, alcohol precursors, dimethyloxymethan, methyloformate, or combinations thereof and aqueous solutions thereof, and other carbonaceous substances amenable to use in direct oxidation fuel cells and fuel cell systems. Furthermore, although the illustrative embodiment of the invention is described with respect to a direct oxidation fuel cell, such as a direct methanol fuel cell (DMFC), it is not limited thereto, but instead is equally applicable and readily adaptable to use with other types of fuel cells such as hydrogen fuel cells.

In accordance with the present invention, measurements and resultant corrective actions are made by adjustments in the load that is placed across the stack. The load is implemented using a DC-DC converter circuit, with an associated programmable microcontroller, that is already in the electronics within the fuel cell system. The DC-DC converter contains internal switches operating at a duty cycle that can be adjusted by the microcontroller. Variations in the duty cycle of the switches in the converter will result in variations in the load that is placed across the fuel cell stack. These adjustments in the load can result in adjustments to the relevant operating parameters being controlled, such as the weakest cell voltage, the stack output voltage, the internal battery current, the stack current and the stack power. Each of the operating characteristics are measured periodically, and as each measurement is taken, a determination is made to find the load change that should be made in order to adjust the stack voltage to achieve a desired goal. This load change is then achieved by adjustments in the duty cycle of the switches within a DC-DC converter.

Thus, in accordance with the invention, these measurements and corrective actions can be taken using components that are already present in the fuel cell system electronics, thus avoiding the need for additional components that could add complexity, bulk and weight to the system.

More specifically, one of the operating parameters that may be important to monitor is individual fuel cell output voltage. As noted, an optimal voltage exists at which efficiency is maximized at a given fuel concentration. In a multiple cell stack with all cells operating optimally, there is a minimum cell voltage above which each cell should be operating. In accordance with the invention, in order to maintain at least this minimum cell voltage, the cell having the actual minimum output voltage (known herein as the "weakest" cell), is identified. The output voltage of this weakest cell is measured and, if it is less than a predetermined minimum voltage, then and estimation if made of the load change needed to cause a change in the stack voltage such that the voltage of each individual cell will correspondingly be increased to a point where the weakest cell reaches the minimum desired cell voltage.

Another parameter that is measured is the output voltage of the stack as a whole. Predetermined stack voltages will be known by system designers for various operating conditions, such as a normal run voltage, or a voltage at which the stack is being run under high temperature conditions (i.e., a "hot" stack). The microcontroller of the present invention is programmed in such a manner that the stack voltage is measured, and, if is does not meet the predetermined voltage for the particular operating conditions, then the load on the fuel cell system is varied in order to adjust the stack output voltage to reach the target value.

In an application in which the fuel cell system is used in a power pack that also includes an internal battery, the load can be varied to ensure that the desired current of the internal battery is maintained. In addition, stack current can also be monitored and maintained by adjustments in the load on the stack. Furthermore, a maximum stack power can be maintained using the techniques of the present invention. In accordance with another aspect of the invention, a fuel concentration can also be measured using adjustments in the duty cycle of the DC-DC converter switches.

BRIEF DESCRIPTION OF THE DRAWINGS

The invention description below refers to the accompanying drawings of which.

DETAILED DESCRIPTION OF AN ILLUSTRATIVE EMBODIMENT

Figure 1:
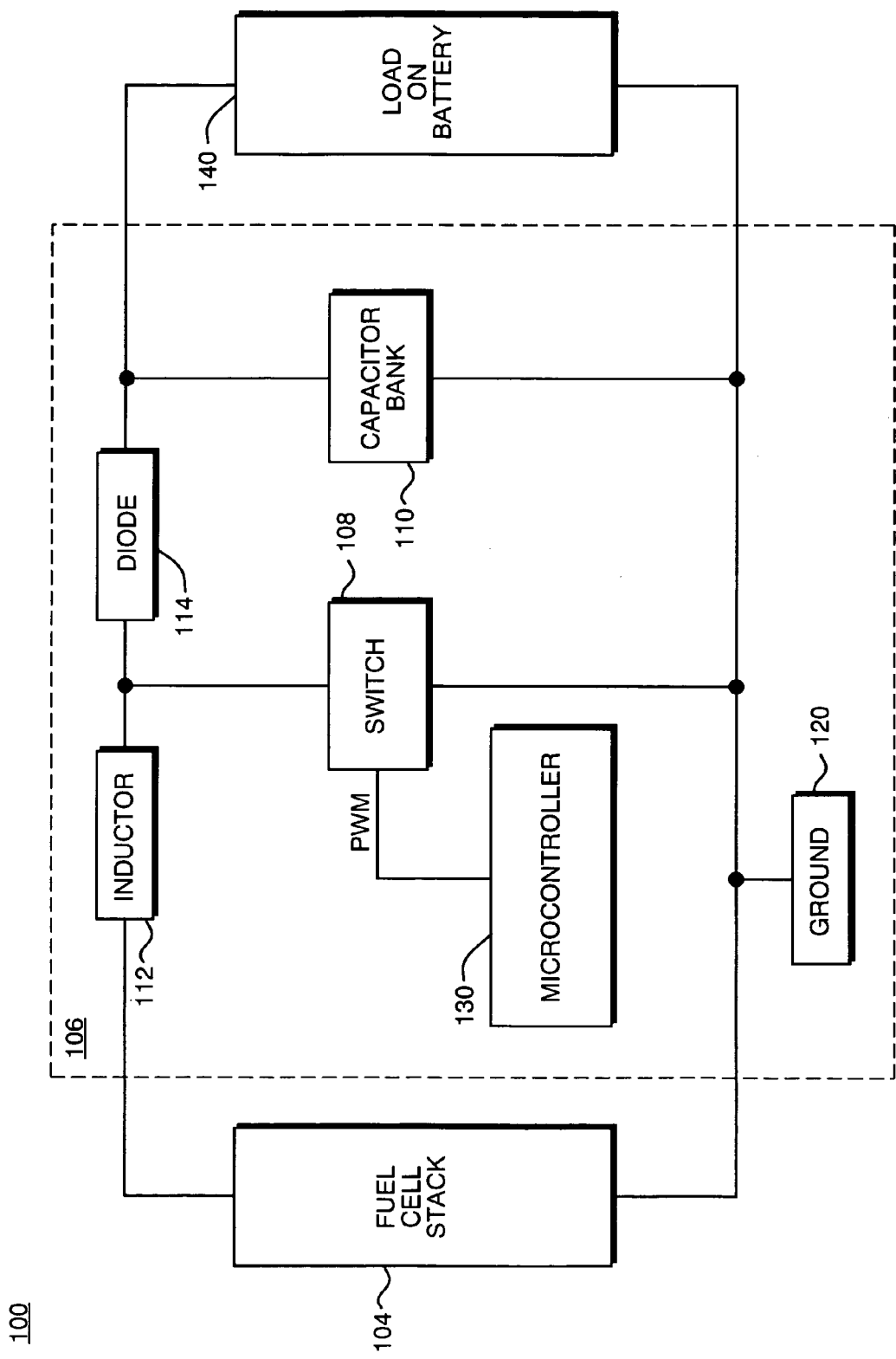
FIG. 1 is a detailed block diagram of the components of a DC-DC converter and microcontroller in accordance with the present invention coupled to a fuel cell stack that is providing power to a load or battery.

One architecture with which the techniques of the present invention may be used is illustrated in FIG. 1. It should be understood, however, that other variations and modifications may be made to this architecture to include additional components or which obviate certain components while remaining within the scope of the present invention.

FIG. 1 illustrates a fuel cell system 100, which includes a fuel cell stack 104. The fuel cell stack 104 is coupled to a DC-DC converter circuit that is enclosed within the dashed box 106. In a basic boost configuration, for example, if the switch 108 has been open for a long time, the voltage across the capacitor bank 110 is equal to the external load or battery voltage. During a charge phase, when the switch 108 closes, the input voltage is impressed across the inductor 112. The diode 114 prevents the capacitor bank 110 from discharging to ground 120, because the input voltage is DC, current through the inductor 112 rises linearly with time at a rate that is proportional to the input voltage divided by the inductance 112. When switch 108 is opened, inductor 112 generates a high voltage which adds to the stack voltage and diode 114 starts conducting current to charge capacitor bank 110.

The switch 108 is controlled by a microcontroller 130 that has been programmed to suitably adjust the duty cycle of the switch or switches in such a manner as to control the load that appears across the stack 104. The microcontroller 130 is programmed to use pulse-width modulation (PWM) control of the programmable DC-DC switches in the converter 106. In one embodiment of the invention, the controller runs at 8 MHz and has an 8 bit PWM cycle. The fuel cell stack and DC-DC converter provide power to an associated load or battery 140. In some embodiments of the invention, the fuel cell system will be part of a power supply unit that includes its own internal battery. The power supply unit could be used to provide power to an application device that itself includes a rechargeable battery, which is referred to herein as the "external battery". In that instance, the fuel cell might be used to charge the internal battery or the external battery or to provide power directly to the application device.

As noted herein, the system and method of the present invention involves the management of a fuel cell system. The microcontroller 130 is programmed to adjust the duty cycle of the switch 108 (which typically comprises multiple switches). The microcontroller 130 is programmed additionally in accordance with the present invention to perform various measurements upon predetermined operating parameters of individual fuel cells or of the fuel cell stack and to make adjustments in the duty cycle of the switches 108 in order to adjust the load that appears across the fuel cell stack 104. This, in turn, adjusts the relevant operating parameter of the fuel cell system.

Figure 2:
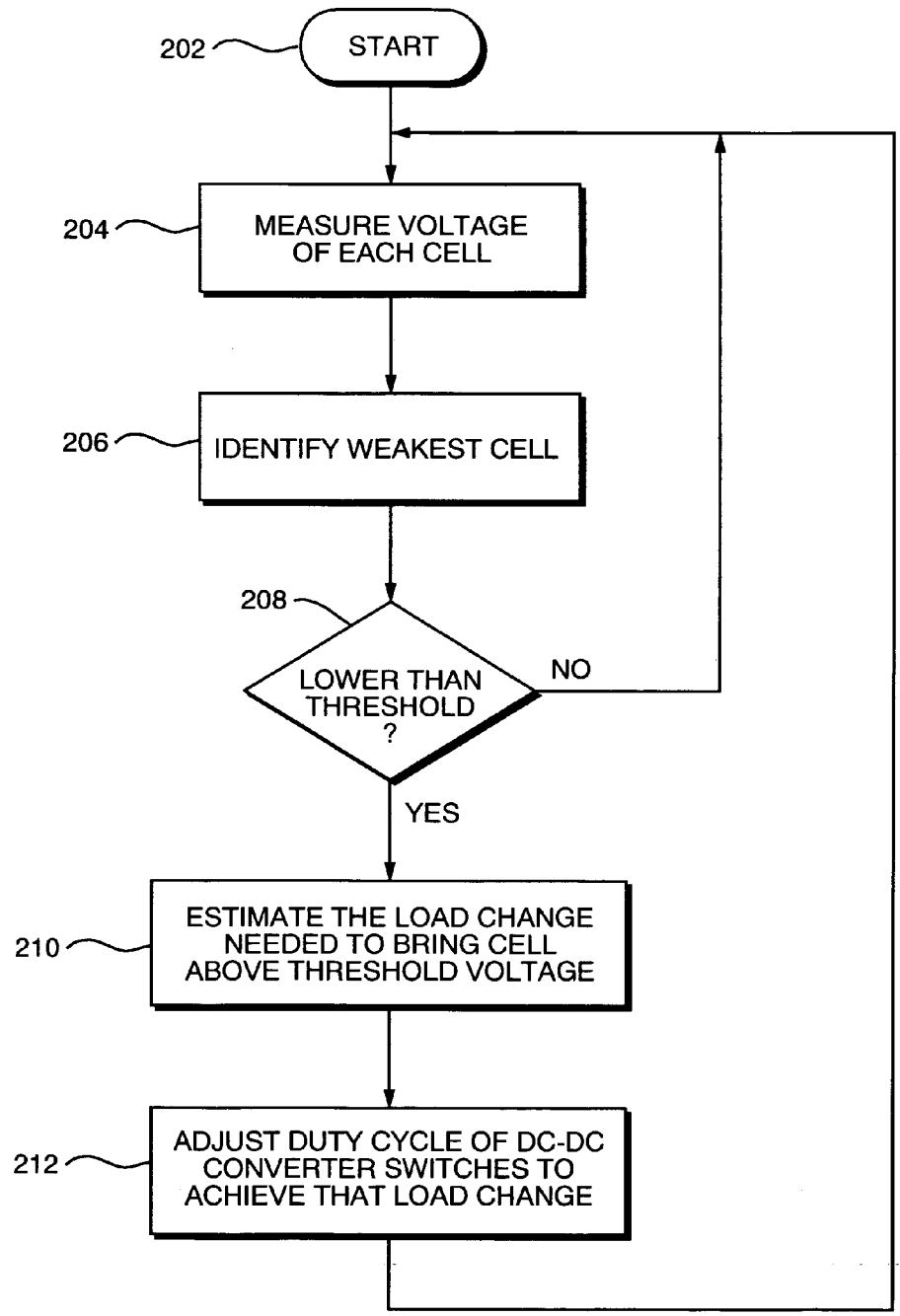
FIG. 2 is a flow chart illustrating a procedure in accordance with the invention in which the weakest cell in a stack is identified and the voltage is measured.

In accordance with a first aspect of the invention, the "weakest" cell is identified and its output voltage is measured. A procedure 200 for making this measurement is illustrated in FIG. 2 (beginning with start step 202). Upon a signal from the microcontroller, individual devices (that are capable of measuring the output voltage of each individual fuel cell in the fuel cell stack) measure the output voltage of each individual cell, as shown in step 204. Once the output voltage of each individual cell is measured, then they are compared and the lowest voltage is selected, thereby identifying the weakest cell, as shown in step 206. The microcontroller then determines whether the output voltage of the weakest cell in the stack is lower than a predetermined threshold, as shown in the decision step 208. As noted herein, the threshold is determined from the optimal voltage for which efficiency is maximized at a given fuel cell concentration. For example, at 1.5M fuel, cells may produce the best overall efficiency when loaded to the point that they produce 0.3V. In a seven cell stack, with all cells operating optimally, one would expect the optimal stack voltage to be 2.1V, thus it may be decided to maintain the weakest cell at a specified voltage of about 0.2V. The output voltage of the weakest cell is compared to this threshold (e.g., 0.2V), and if it is not lower than the threshold, there is no asymmetry or other problem suspected and the procedure 200 loops back and the measurement is continued periodically.

If, on the other hand, the voltage is lower than the threshold, meaning the weakest cell is operating at too low of a voltage, then the procedure continues to step 210 in which an estimation is performed to determine the load change needed to bring the overall stack output voltage to an amount sufficient to cause the weakest cell to operate above the threshold. It is noted that stack output falls off slightly when any particular cell develops a temporary problem, and the extent to which stack voltage must be increased to satisfy the weakest cell is a measure of the severity of the cell asymmetries.

The estimation can be made by subtracting a desired load from the actual load, which results in a value that can multiplied by a suitable gain factor. From this, it is determined how to adjust the duty cycle of the DC-DC converter switches to implement the load change that is needed to achieve the desired result. More specifically, once the estimation is made to determine the load change required, then the microcontroller 130 (FIG. 1) signals the DC-DC converter to adjust the duty cycle of the switches to achieve the desired load across the fuel cell stack 104, and this is illustrated in step 212. In this way, the techniques of the present invention use circuitry already contained in the fuel cell system electronics to vary stack load in order to maintain the weakest cell at a specified voltage.

In addition, the stack voltage is maintained at a slightly higher voltage to prevent any individual cell from dropping below the minimum to prevent reversal or other damage to individual fuel cells. For example, when starting up a bipolar system that includes pumps, fans and valves and the like, this control technique allows the stack to continue to operate safely and productively until pumps, fans and the stochastic process of bubbles moving around the recirculation loop even out cell performances.

Figure 3:
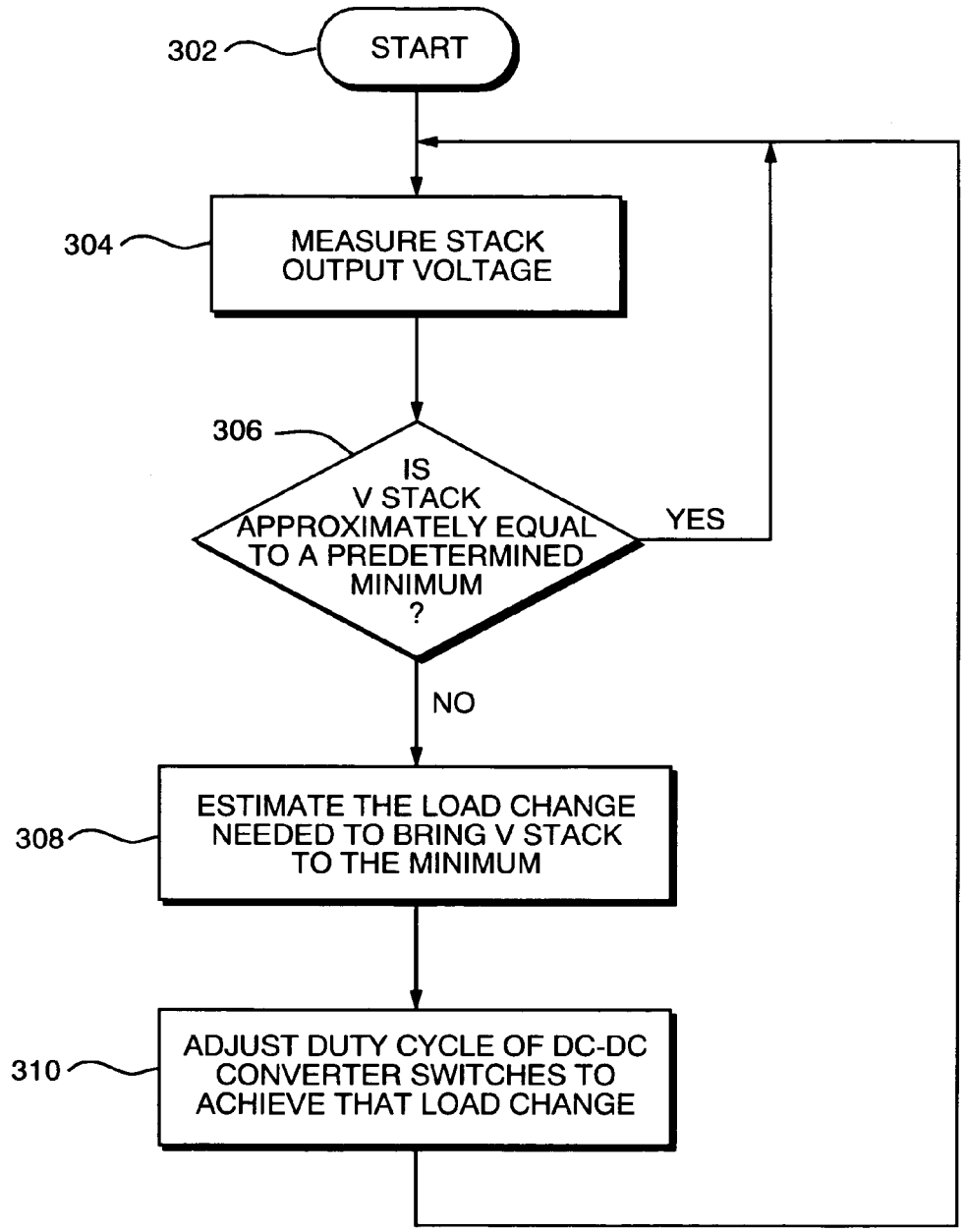
FIG. 3 is a flow chart illustrating a procedure in accordance with the present invention regarding measurement and adjustment of the stack output voltage.

In accordance with another aspect of the invention, the stack output voltage is measured, and will be maintained at a desired level by the system of the present invention, as dictated by the operating conditions of the fuel cell system. More specifically, FIG. 3 illustrates a procedure 300 by which stack output voltage is measured as indicated in step 304. The decision step 306 involves the stack output voltage being compared to a reference that is a predetermined optimal value. For example, stack output voltage is of one desired value when the stack is running at a normal rate, for normal operating conditions, and a different value when the stack is operated at a "hot rate." The microcontroller 130 (FIG. 1) is programmed to compare the actual output voltage of the stack with the predetermined set point for the present conditions, as illustrated in decision step 306. If the stack is operating at the desired output voltage, then the process will simply continue to check periodically. Instead, if the stack voltage is below the desired amount, then the procedure will continue to step 308 which is to estimate the load change needed to bring the stack output voltage above the minimum for those operating conditions. Thus, the load would be reduced by a given amount. In order to do this, as illustrated in step 310, the microcontroller 130 adjusts the duty cycle of the DC-DC converter switches to achieve that load change. In this manner, the output voltage of the stack is controlled by maintaining it at a desired level in accordance with the operating conditions at that particular time.

Figure 4:
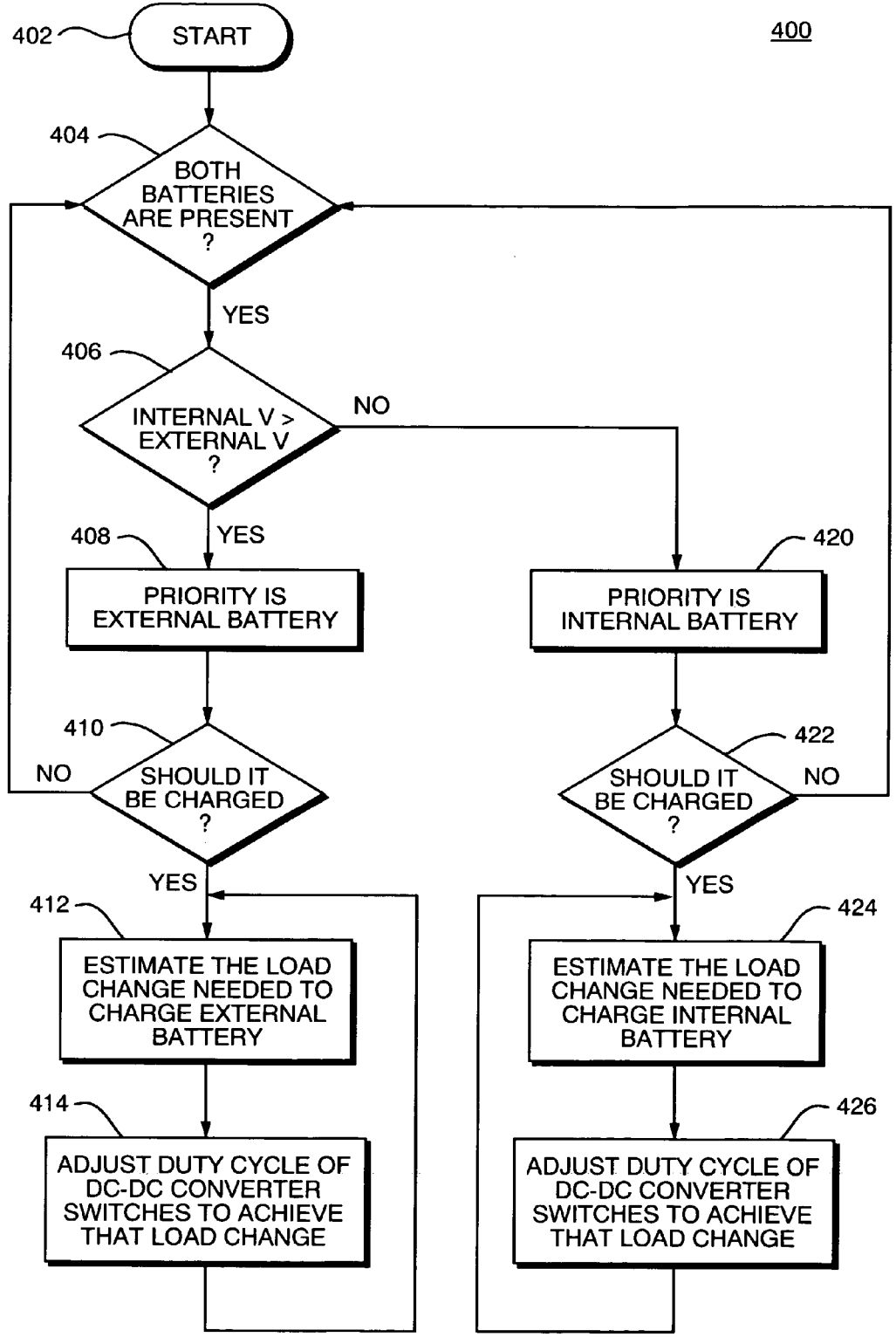
FIG. 4 is a flow chart illustrating a procedure in accordance with the present invention regarding charging of the internal and external battery.

A procedure 400 is illustrated in FIG. 4, which begins with a start step 402. The first item 404 is to check whether there is both an internal battery and an external battery present in the system. It is assumed, for purposes of this illustration, that both batteries are present so the flow chart continues to the step 406. Step 406 is a decision step that is a comparison by the microcontroller of whether the output voltage of the internal battery is greater than the output voltage of the external battery. If the voltage of the internal battery is greater, then the procedure continues to step 408 and that branch of the procedure is followed. If the external battery has a greater voltage, then the procedure continues to the branch on the right side of FIG. 4.

Assume that the decision step 406 indicates that the output voltage of the internal battery is the greater of the two, then the priority (for charging purposes) is determined to be the external battery, as illustrated in step 408. It should be understood that there may be other reasons why the priority is determined to be the external battery, in which case the branch starting with step 408 would similarly be followed in that instance. The procedure then continues to the decision step 410, which is whether the external battery needs to be charged. If not, then periodic measurements are performed in order to continuously check whether charging is required. If the battery does need to be charged, then the load change required to produce the stack voltage required to charge the external battery is estimated at step 412. This estimation, in turn, results in an adjustment of the duty cycle of the DC-DC converter switches to achieve that load change (step 414).

If the priority is the internal battery, as illustrated in step 420, then it is determined in decision step 422 whether the internal battery requires charging and, if it does require charging, the load change required to charge the internal battery is estimated as illustrated in step 424. The duty cycle of the DC-DC converter switches is adjusted accordingly, as illustrated in step 426. There may be different batteries contained within various systems which may have different charge rates, so the particular estimations and adjustments in steps 412 and 424, and steps 414 and 426, respectively, may vary from system to system, while remaining in the scope of the invention.

Figure 5:
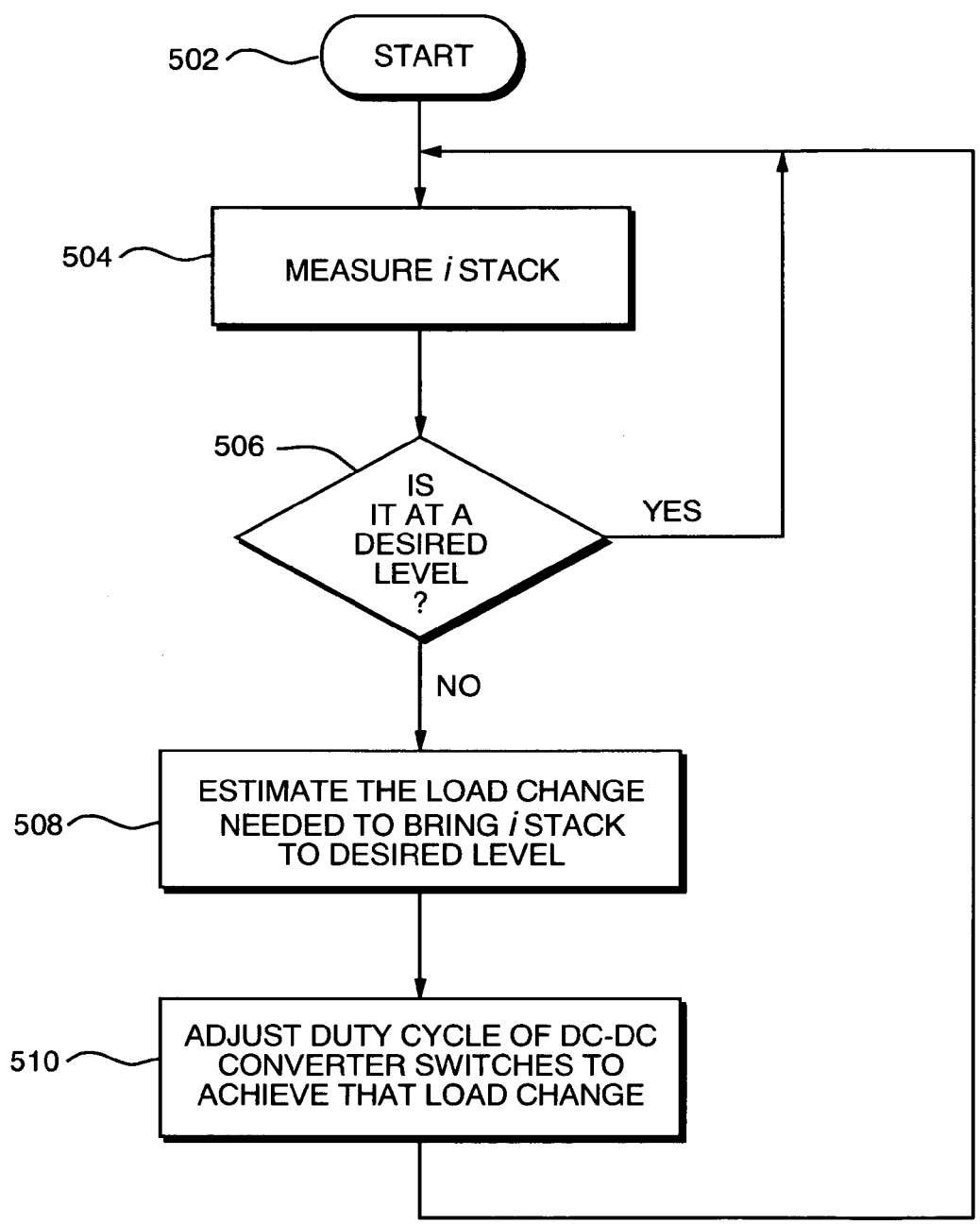
FIG. 5 is a flow chart illustrating a procedure in accordance with the present invention regarding measuring the current of the stack.

Another aspect of the invention involves measuring the current of the fuel cell stack. This is illustrated in the procedure 500 of FIG. 5, which begins with the start step 502. The stack output current is measured, as illustrated in step 504. The actual output current of the stack is compared to a predetermined value, which is based upon the desired fuel cell efficiency, and this comparison occurs at the decision step 506. If the output current of the stack is at or above the desired level, then the procedure continues to periodically make measurements and comparisons. If the stack current is below a desired level (or above a desired level in another embodiment of the invention), then the procedure 500 continues to step 508, which, similar to the other procedures of the present invention, involves estimating the load change necessary to bring the output current of the stack to a desired level for a given output voltage. As illustrated in step 510, the duty cycle of the DC-DC converter switch is adjusted to achieve that load change. The actual calculation varies depending upon the type of fuel cell being controlled using the techniques of the present invention.

Figure 6:
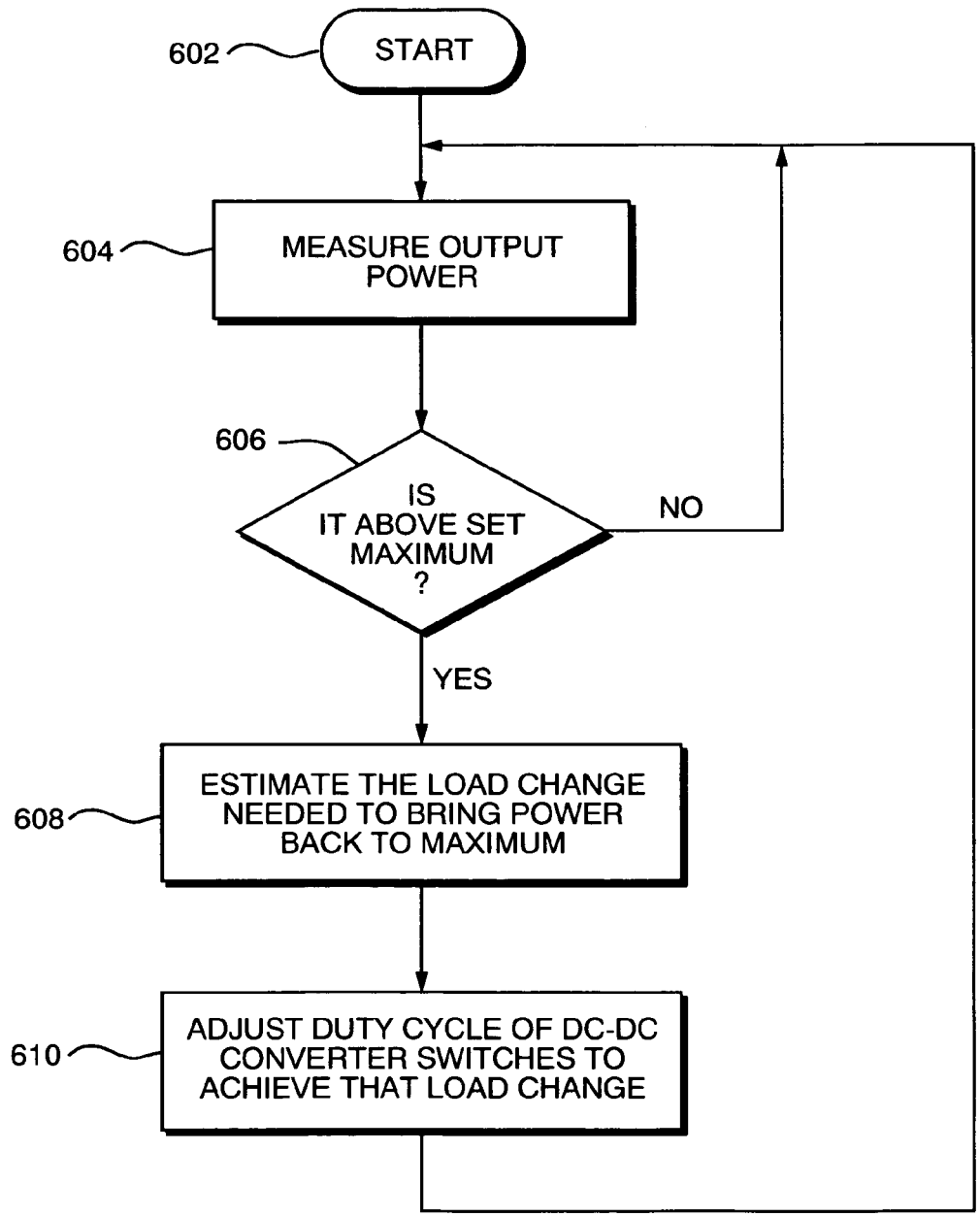
FIG. 6 is a flow chart illustrating a procedure in accordance with the present invention regarding measurement and adjustment of output power of the fuel system.

An additional measurement that can be performed using the techniques of the present invention is illustrated in the procedure 600 of FIG. 6. In this embodiment of the invention the output power of the fuel cell system is measured, as illustrated in step 604. A decision step 606 inquires whether the output power is above a predetermined maximum. If it is not, the measuring loop continues periodically to check the power output. If the output power is above a predetermined maximum amount, then "too much" is being produced. The estimation of the load change needed to bring the power back to the maximum is performed as in step 608. Otherwise, power could be generated that is not useful or needed by the batteries or application device and thereby may be wasted. Once the calculation of the load is performed then the duty cycle of the DC-DC converter is adjusted to achieve that load needed to bring the power down. (step 610).

Figure 7:
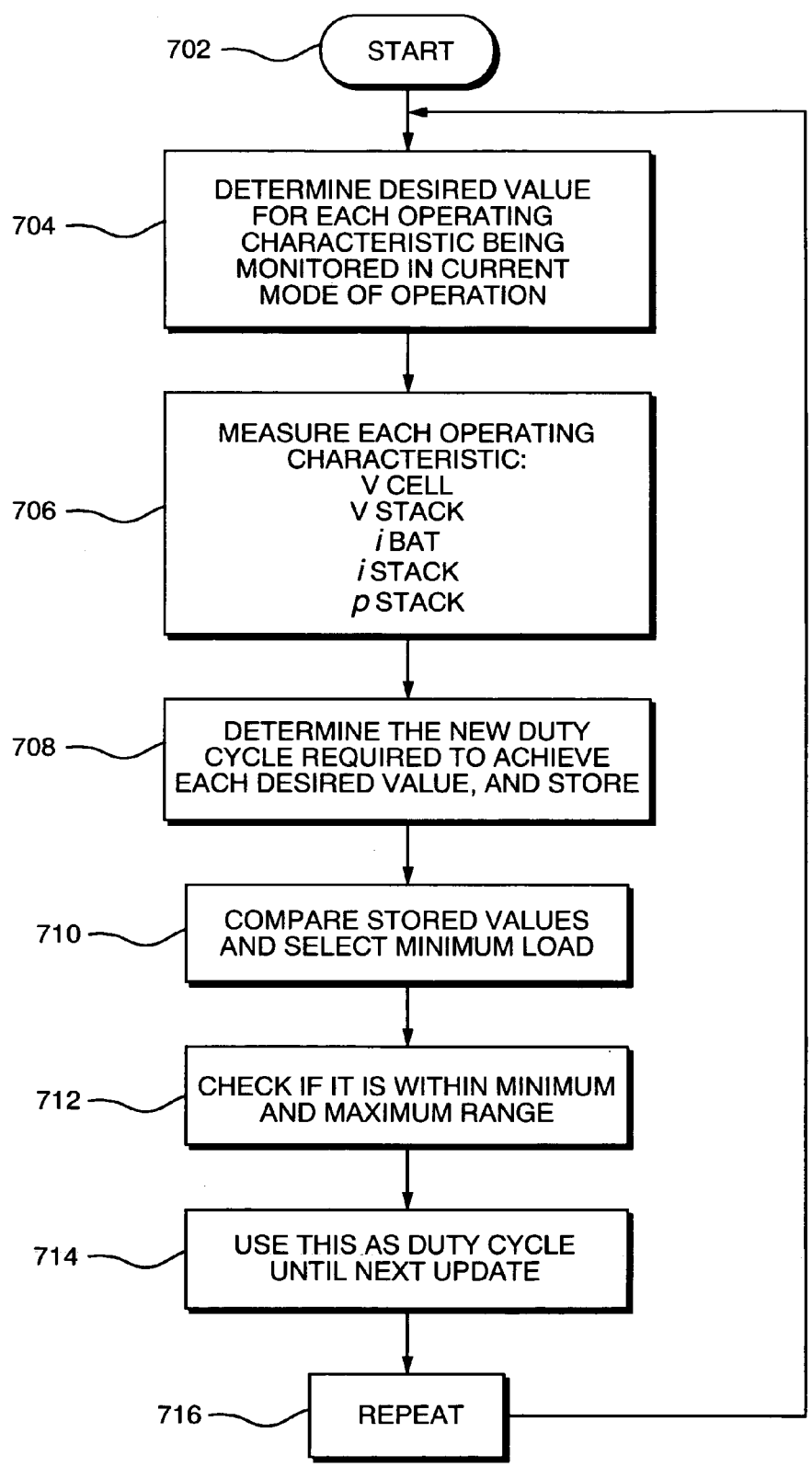
FIG. 7 is a flow chart illustrating a procedure regarding calculation of duty cycles required by various operating parameter settings and the selection of the minimum load.

In accordance with yet another technique of the present invention, one way of maintaining safe loading on the fuel cell in order to ensure that the parameters that were just discussed remain at the desired levels is to choose the minimum duty of all of the above mentioned determinations, and this is illustrated in greater detail in FIG. 7.

More specifically, the procedure 700 (FIG. 7) begins with the start step 702 and then proceeds to step 704 in which a desired value for each operating parameter to be monitored is determined. This will be based upon the mode in which the fuel cell stack is being operated. For example, the fuel cell stack may be in a start up state in which the output voltages and voltages of each cell, for example, would be different than in a continuously operating state. In addition, the cell may be in an initial fueling state or a refueling state in which certain operating characteristics would be of values at other than those that would be considered appropriate in normal operating circumstances. The stack could be in a hot state or an overtemperature state. Alternatively, the stack could be in a "run state" in which normal operating conditions prevail and the stack is operating normally to supply power to a battery or an application device. As will be understood by those skilled in the art, there may be other states in which the stack may be operated in certain circumstances or applications of the invention. As indicated, step 704 involves determining the desired value for each operating characteristic being monitored depending upon the mode of operation in which the fuel cell stack is running at that particular point in time. Microcontroller 130 is suitably programmed to make these decisions and to perform the required adjustments in accordance with this aspect of the invention, and in the other techniques previously described.

The next step is to measure each of the operating parameters, as illustrated in step 706, which sets forth the following operating characteristics: V CELL, V STACK, i BAT (the current of the battery being powered by the fuel cell), i STACK (stack current) and p STACK (power output of the stack). It should be understood, however, that other operating characteristics could be included in (or removed from) this list as desired in particular applications of the invention. The invention next includes the step 708, which is to determine and store the duty cycle required to achieve the desired value of the operating characteristic compared to its presently measured value. Once all of the values of the new duty cycle determinations have been stored, the next step in accordance with this aspect of the method is to compare the stored new duty amounts and to select the minimum duty required, as illustrated in step 710. The new duty cycle that has been selected is then compared to a minimum and maximum amount for the duty cycle for that particular application of the invention (step 712). Assuming it does fall within the allowed range, this value is used as the new duty cycle for the DC-DC converter of the system as shown in step 714. These determinations and assignment of a new duty cycle may be performed 4 times per second in order to control the average load seen by the fuel cell stack. As noted, as each measurement is taken, as illustrated in FIGS. 2-6, the new duty required to achieve the desired level of each operating characteristic is determined and stored, and the stored values are compared regularly as the measurements are occurring.

In accordance with another embodiment of the present invention, the measurement of fuel cell stack current can also be used as a controller-initiated methanol concentration detector. More particularly, the fuel cell containing the lowest concentration of fuel is a good indicator of overall fuel concentration in the stack. In accordance with the present invention, in order to find the concentration, the stack current is increased until the stack voltage is reduced to the point where the voltage of the weakest cell goes to zero. This simulates a virtual short circuit of that single cell and the current supported by that cell will be primarily limited by the methanol concentration on its anode. Since the other cells have the same or higher methanol concentration, they would not affect this limiting stack current.

In many applications, a stall current of about 1 amp (A) indicates a reasonable methanol concentration of about 1-2M. This current drops to 0.2 A as fuel is exhausted from the recirculation loop. The technique of the present invention allows a determination of when to dose additional fuel before power drop off occurs. It also allows prevention of overdosing. Although there is some temperature dependency, this dependency is smaller than the response to fuel concentration variation so it can be ignored for purposes of this measurement. Thus, in addition, in accordance with the techniques of the present invention, when the minimum cell voltage is reduced to approximately 0.1, the controller is programmed to automatically measure current and this is a reliable indicator of methanol concentration because (at that point) the concentration is still on the vertical concentration limited tail of the cell VI characteristic. As will be understood by those skilled in the art, on that portion of the VI curve, the current is directly proportional to the methanol concentration so that a measurement of current will provide a measurement of the concentration. Should the concentration be inadequate, additional methanol dosing can be then signaled by the controller to the fuel reservoir or other fuel delivery means in order to add additional fuel.

Figure 8:
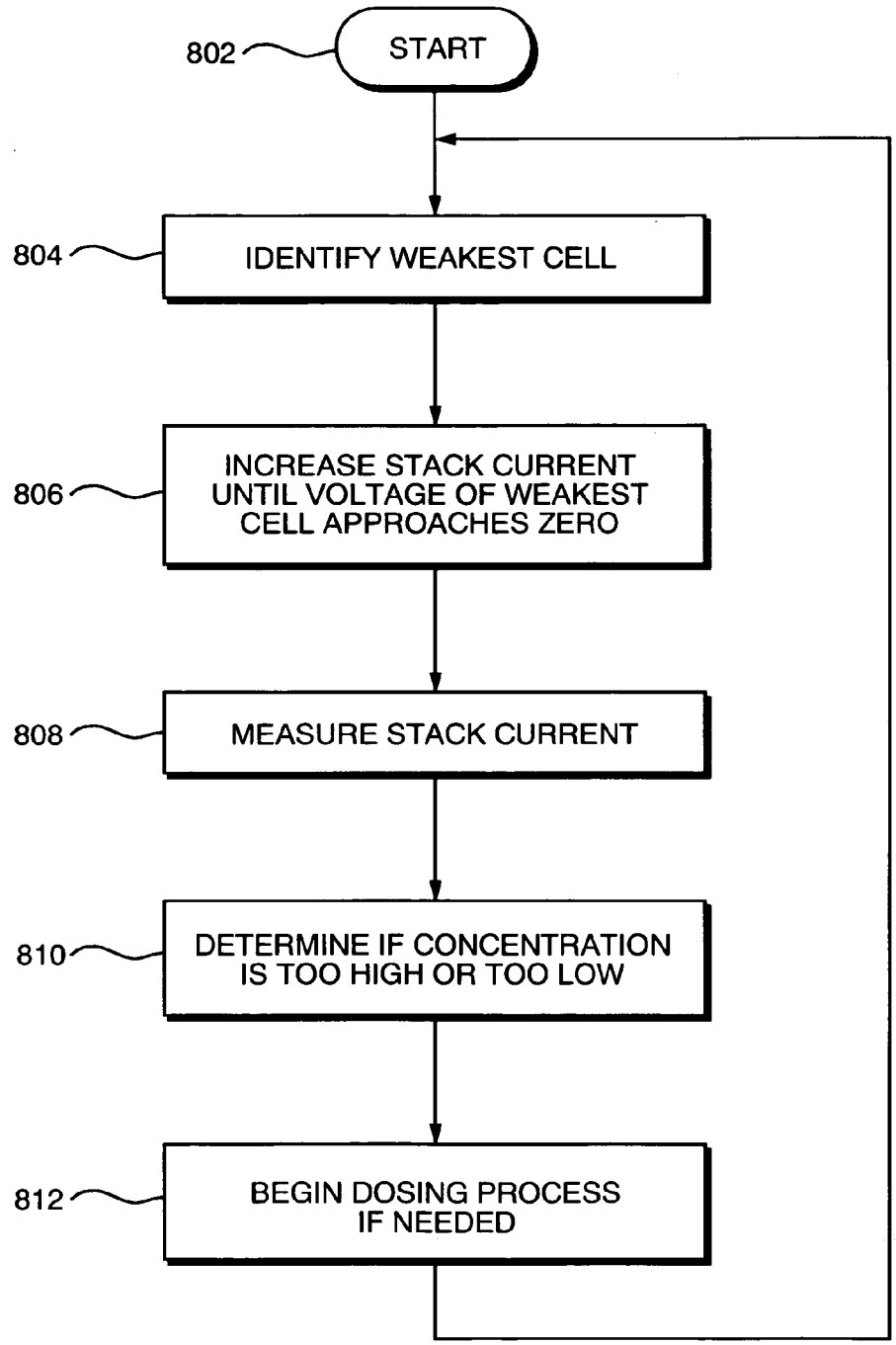
FIG. 8 is a flow chart illustrating a procedure in accordance with the invention regarding fuel concentration.

This aspect of the invention is illustrated in the procedure of FIG. 8, which begins with the start step 802 and in step 804 the weakest cell is identified. Next, the stack current is increased until the stack voltage is such that the voltage of the weakest cell approaches zero (806). The current of the stack is then measured, as shown in step 808.

Based upon the current measurement, the next step (810) is to determine whether the concentration is too high or too low. If the concentration is too low, a dosing process is initiated, as indicated in step 812. It should be understood that in accordance with the present invention, each of the measurements described herein is performed periodically as the fuel cell system operates, and the timing of such can be varied depending upon the particular application of the invention.

It should be further understood by those skilled in the art that the present invention provides a versatile technique for controlling the various operating characteristics of a fuel cell system including fuel cell concentration and the techniques can be performed with no additional hardware, but instead with a programmable controller and associated DC-DC converter that are already on board in the fuel cell stack electronics. It should be further understood that the microcontroller can be readily reprogrammed to adjust or change the operating characteristics, parameters, or values or the sequence by which the measurements and control signaling is performed, while remaining within the scope of the present invention.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of dynamically controlling and managing operating characteristics of a fuel cell system, comprising:
   (A) providing a DC-DC converter circuit having an input connection to receive the output of a fuel cell, and connected to place a load across the fuel cell, said DC-DC converter circuit having internal switches that are operated at a duty cycle that is adjustable;
   (B) providing a programmable controller that receives as an input, present and stored values of one or more operating characteristics, said programmable controller also being programmed to signal said DC-DC converter switches to adjust its duty cycle;
   (C) identifying a weakest cell in a fuel cell stack;
   (D) measuring the output voltage of the weakest cell;
   (E) dynamically determining a desired value for said output voltage;
   (F) comparing a present value of said weakest cell output voltage with a desired value;
   (G) calculating a new duty cycle for the associated DC-DC converter within the fuel cell system required to substantially achieve said desired value for the output voltage of the weakest cell; and
   (H) signaling said DC-DC converter to adjust its duty cycle to said new duty cycle.

2. A method of dynamically controlling and managing operating characteristics of a fuel cell system used to power a battery or an application device, comprising:
   (A) providing a DC-DC converter circuit having an input connection to receive the output of a fuel cell, and connected to place a load across the fuel cell, said DC-DC converter circuit having internal switches that are operated at a duty cycle that is adjustable;
   (B) providing a programmable controller that receives as an input, present and stored values of one or more operating characteristics, said programmable controller also being programmed to signal said DC-DC converter switches to adjust its duty cycle;
   (C) dynamically determining a desired value for a plurality of operating characteristics of the fuel cell system, depending upon the operating conditions of the fuel cell system;
   (D) measuring said plurality of operating characteristics;
   (E) dynamically determining an output power of the fuel cell stack that does not exceed a maximum power needed by at least one of the battery or the application device being powered by the system, but maintains said desired values of said operating characteristics;
   (F) comparing a present value of said output power with a desired value;
   (G) calculating a new duty cycle for the associated DC-DC converter within the fuel cell system required to substantially achieve said desired value for the output power; and
   (H) signaling the DC-DC converter to adjust its duty cycle to said new duty cycle.

3. A method of controlling a fuel cell system, comprising:
   (A) dynamically determining desired values for a plurality of operating characteristics being monitored in a current mode of operation of a fuel cell system;
   (B) measuring each of said selected operating characteristics;
   (C) determining a duty cycle required to substantially achieve each individual desired value and storing each duty cycle;
   (D) comparing stored values and selecting the minimum duty cycle; and
   (E) using this duty cycle as the new duty cycle of the DC-DC converter circuit switches within said fuel cell system.

4. The method as defined in claim 3 further comprising:
   periodically repeating determining the desired values and the measurements and updating the duty cycle.

5. A method of dynamically controlling and managing temperature in a fuel cell system, comprising:
   (A) measuring the stack output voltage of the fuel cell system;
   (B) determining whether the stack output voltage is at a desired value depending upon the present desired temperature range of the fuel cell system, for the present operating conditions, and
   (C) adjusting the duty cycle of an associated DC-DC converter to change the output stack voltage to substantially the desired value.

* * * * *